United States Patent
Suonvieri et al.

(10) Patent No.: US 6,259,919 B1
(45) Date of Patent: *Jul. 10, 2001

(54) METHOD FOR IDENTIFYING A FAST SPEED MOBILE STATION, AND A BASE STATION

(75) Inventors: Jukka Suonvieri; Kullervo Inkinen, both of Tampere (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,495
(22) PCT Filed: Jun. 13, 1996
(86) PCT No.: PCT/FI96/00352
   § 371 Date: Feb. 14, 1997
   § 102(e) Date: Feb. 14, 1997
(87) PCT Pub. No.: WO97/00587
   PCT Pub. Date: Jan. 3, 1997

(30) Foreign Application Priority Data

Jun. 16, 1995 (FI) .......................................... 953013

(51) Int. Cl.⁷ ........................................ H04Q 7/20
(52) U.S. Cl. ........................ 455/441; 455/444; 375/341

(58) Field of Search ...................................... 455/422, 436, 455/437, 438, 439, 441, 444, 449, 450, 517, 524, 429; 375/341, 346

(56) References Cited

U.S. PATENT DOCUMENTS

| | | |
|---|---|---|
| 5,239,667 | 8/1993 | Kanai . |
| 5,392,453 | 2/1995 | Gudmundson et al. . |
| 5,396,253 | 3/1995 | Chia . |
| 5,396,645 | 3/1995 | Huff . |
| 5,548,806 * | 8/1996 | Yamaguchi et al. ................. 455/444 |
| 5,729,558 * | 3/1998 | Mobin ................................. 375/341 |

FOREIGN PATENT DOCUMENTS

| | | |
|---|---|---|
| 578 156 | 1/1994 | (EP) . |
| 93/00777 | 1/1993 | (WO) . |

* cited by examiner

Primary Examiner—Reinhard J. Eisenzopf
Assistant Examiner—Sam Bhattacharya
(74) Attorney, Agent, or Firm—Pillsbury Madison & Sutro Intellectual Property

(57) ABSTRACT

A method for identifying a fast speed mobile station (MS) in a radio system, said method comprising measuring the frequency error of radio signals received from a mobile station. In order for a fast speed mobile station to be more reliably identified than before, the method comprises calculating the change (df) in BSC the frequency error from a time interval (t) of predetermined length, and identifying the mobile station as a fast speed mobile station if the change (df) in the calculated frequency error exceeds a predetermined limit value.

13 Claims, 2 Drawing Sheets

METHOD FOR IDENTIFYING A FAST SPEED MOBILE STATION, AND A BASE STATION

This application is the national phase of international application PCT/ F196/00352 filed Jun. 13, 1996 which designated the U.S.

BACKGROUND OF THE INVENTION

1. Field of the Invention

The invention relates to a method for identifying a fast speed mobile station in a radio system, said method comprising measuring the frequency error of radio signals received from a mobile station.

The invention further relates to a base station of a radio system, said base station comprising receiver means for receiving signals transmitted by a radio unit, and measuring means for measuring the frequency error of the received signals.

2. Description of Related Art

The invention relates particularly to the problem created in cellular radio systems when a fast speed mobile station (FSMS) roams in a microcellular network and thus changes base station frequently. Changes of base station load the network management resources significantly and, moreover, the quality of the connection deteriorates. In a situation of this kind it is preferable to hand a fast speed mobile station over to a larger radio cell which serves a larger area "above" the microcells, i.e. which covers the same geographical area as a number of microcells together. The problem that arises is that it is very difficult to identify a fast speed mobile station reliably.

Previously known methods for identifying a fast speed mobile station are based on measuring time. These methods comprise measuring the time between two handovers. If the measured time is sufficiently short, it is assumed that a fast speed mobile station is in question. Since the identification methods are based on measuring the time, a fast speed mobile station has usually reached the area of at least the second or third microcell in a microcellular network before it is identified; the identification thus takes place at a rather late stage. In addition, a mobile station moving on the periphery of a cell can be interpreted as a fast speed mobile station if it moves in an unfavourable direction through the periphery of cells. Since the above-mentioned larger radio cell has usually limited capacity, the interpretation of slow speed mobile stations as fast speed mobile stations may unnecessarily overload the larger radio cell.

SUMMARY OF THE INVENTION

The object of the present invention is to solve the problem described above and to provide a method for identifying a fast speed mobile station more reliably and rapidly than before. This is achieved with the method of the invention, which is characterized by calculating the change in the frequency error from a time interval of predetermined length, and identifying a mobile station as a fast speed mobile station if the change in the calculated frequency error exceeds a predetermined limit value.

The invention further relates to a base station in which the method of the invention can be utilized. The base station of the invention is characterized in that it further comprises a calculator unit responsive to the measuring means and arranged to calculate the change in the frequency error in a time interval of predetermined length, and a comparator means responsive to the calculator unit and arranged to compare the change in the frequency error with a predetermined limit value and to identify a radio unit as a fast speed radio unit if the change in the frequency error exceeds the limit value.

The invention is based on the idea that a fast speed mobile station can be identified more reliably and rapidly than before by measuring the frequency error (Doppler effect) caused by the motion of the mobile station. This is because, in practice, a mobile station always passes a base station, whereby the frequency error caused by the Doppler effect changes. Passing means herein that the distance between the mobile station and the base station diminishes until the mobile station reaches a certain point after which the distance between the mobile station and the base station begins to increase. The rate of change in the frequency error, i.e. the frequency change per a unit of time, depends on the speed of the mobile station in relation to the base station. The identification of a high speed mobile station passing the base station is thus based on the fact that the change in the frequency error exceeds a certain limit. The most significant advantages of the solution of the present invention are that a fast speed mobile station can be identified at an earlier stage than before, i.e. in the first radio cell; that a "normal", slow speed mobile station cannot be interpreted by mistake as a fast speed mobile station irrespective of its direction of motion with respect to the cells; and that the invention can be applied in existing base stations for instance by means of a computer program, since invention requires only that the base station comprises measuring devices known per se for measuring the frequency error of received signals.

According to a preferred embodiment of the invention, the change in the frequency error is found by calculating a first average frequency error during a first time interval and thereafter a second average frequency error during a second time interval, and finally the absolute value of the difference between the first and the second average. The durations of the time intervals have preferably been selected to be several seconds. The oscillation which is caused by inaccuracies and which occurs between the individual measurement results is removed by a filter, and the change in the frequency error can be calculated more accurately than before.

The base station according to a preferred embodiment of the invention comprises means for adjusting the limit value to correlate with a set value given by the operator and/or correspondingly for adjusting the length of the time interval from which the average of the frequency change on which the comparison is based is calculated. This allows the frequency change on the basis of which the base station interprets a mobile station as a fast speed mobile station to be adjusted base-station-specifically; it is therefore possible to take into account, for example, the course of a road passing the base station. It is also possible to take into account the speed limit on this section of the road.

BRIEF DESCRIPTION OF THE DRAWINGS

In the following, the invention will be described in greater detail by means of a preferred embodiment of the invention and with reference to the accompanying drawings, in which.

DETAILED DESCRIPTION OF A PREFERRED EMBODIMENT

Figure 1:
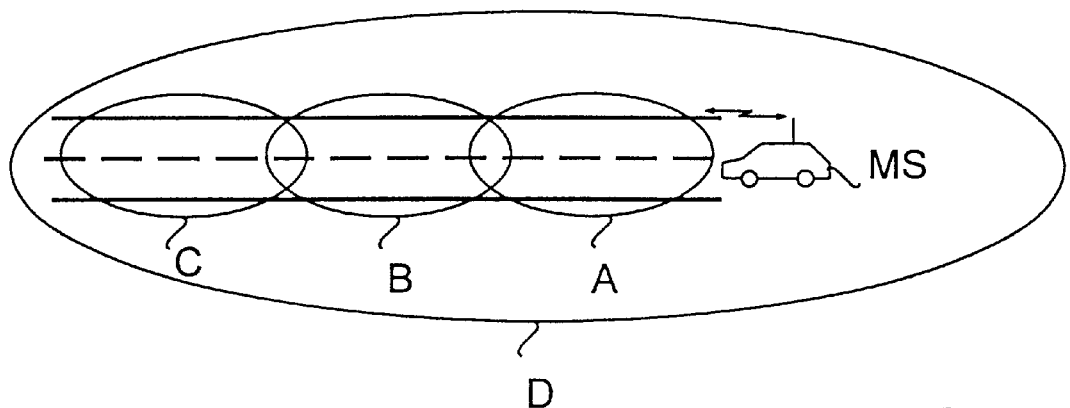
FIG. 1 illustrates the motion of a mobile station in a cellular radio system.

FIG. 1 illustrates the motion of a mobile station in a cellular radio system. The part of a cellular radio system illustrated in FIG. 1 may be, for example, the GSM system (Groupe Special Mobile). Microcells A, B and C are arranged along a road and, in addition, the section of the road is served by a larger cell D.

When the mobile station MS in the car shown in FIG. 1 moves along the road, it is at first served by the base station of cell A. Thereafter a handover takes place to the base station of cell B and finally to the base station of cell C. If the mobile station is a fast speed mobile station (FSMS), these handovers take place at very short intervals, which loads the network management resources unnecessarily, and moreover, the quality of the connection deteriorates. In the case of FIG. 1, it would therefore be more advantageous to hand the mobile station MS over to the larger cell D, if it is identified as a fast speed mobile station.

Figure 2:
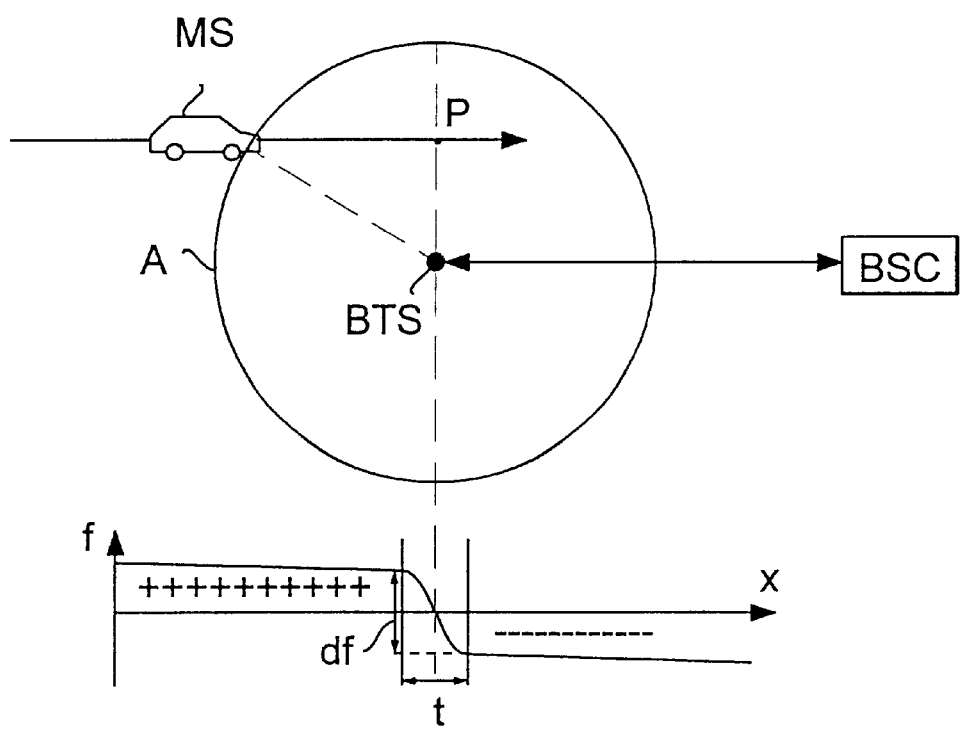
FIG. 2 illustrates the frequency error detected by the base station as a function of the location of the mobile station.

FIG. 2 illustrates the frequency error detected by the base station as a function of the location of the mobile station MS. In the case of FIG. 2, the car with the mobile station MS passes the base station of cell A at a constant speed from left to right. As appears from FIG. 2, the distance between the base station BTS and the mobile station diminishes until the mobile station reaches point P, whereafter the distance between them begins to grow.

It can be seen from the curve of FIG. 2 that the passing of point P is detected by the base station BTS in such a way that the frequency error caused by the Doppler effect changes, i.e. becomes smaller, in a stepwise manner, as shown in FIG. 2. In practice, the sign of the frequency error changes almost always from positive to negative. When the base station calculates the rate df/t of the change in the frequency error, where t is a time interval of predetermined length, the base station can according to the invention find out whether the mobile station in question is a fast speed mobile station by comparing the absolute value of the result with a predetermined limit value.

When the base station has identified the mobile station MS as a fast speed mobile station, it sends the base station controller BSC a report to this effect. The base station controller BSC can thus, if necessary, perform for instance a handover for handing a fast speed mobile station over from microcell A to cell D, which serves a larger area (cf. FIG. 1).

A mobile station operating in accordance with the GSM specifications measures its environment continuously and reports the measuring data through a base station BTS to the base station controller BSC. The measurements include, for example, measuring the coverage of the nearby base stations and comparing the signal level of the current base station and that of the neighboring base stations during a call. According to the GSM specifications, these measuring data are reported to the base station controller BSC when the measurement period has ended, whereby the reporting interval will be approximately 480 ms.

During a call the base station BTS, furthermore, performs e.g. RX_LEVEL (signal level) received from a mobile station), RX_QUAL (signal quality, i.e. bit error rate) and timing advance (distance between the mobile station and the base station) measurements. The base station combines the above-mentioned measurement results with the measurement results obtained from the mobile station MS and reports them to the base station controller BSC in accordance with the GSM specifications. The reporting of the measurement results is described, for instance, in GSM Specification 08.58, which is incorporated herein by reference.

According to the invention, a field relating to the speed of the mobile is added to the above-mentioned report on the measurement results. By means of this field the base station controller can be informed that the mobile station in question is a fast speed mobile station. According to the simplest embodiment, the base station controller can be informed by a single bit that the mobile station is a fast speed mobile station. However, it is advantageous to transmit to the base station controller even other information relating to the fast speed mobile station; the optional field incorporated in the measuring report thus preferably contains further information. The term 'optional field' refers herein to the fact that information on the speed of a mobile station is not transmitted in each measurement report but only in the case of a fast speed mobile station.

The optional field to be incorporated in the measurement report may contain, for example, the following information:

Speed class of the mobile station. This information is always included, and it indicates the speed of the mobile station with a desired accuracy. The accuracy employed may be cell-specifically adjustable: e.g. very fast/fast/moving/slow (in practice, it is not necessary to inform the base station controller BSC of the last alternative, since it can be used as the default value when the measuring report does not contain an optional field).

Accelerating/decelerating mobile station. This information is not necessary. It is, however, useful when the mobile station MS does not actually pass the base station at any stage but moves, for instance, constantly away from the base station at an accelerating rate; in this case, the mobile station could be erroneously interpreted, during powerful acceleration, as a fast speed mobile station on the basis of the change in the frequency error. The base station can identify an accelerating mobile station MS, for example, since its timing advance value differs from the corresponding value of fast speed mobile stations.

Distance to the mobile station. This information is not necessary, since the base station controller BSC is, in any case, aware of the distance to the mobile station at the reporting moment. It can be transmitted to the base station controller if the distance to be reported is other than the distance at the moment of reporting: e.g. the distance at the instant when the monitoring of the mobile station began.

Measured frequency error. This information is not necessary but it is useful, for instance, when the mobile station is moving far away from the base station. This is because it is possible that mobile stations moving along a road that is far from the base station are hardly ever detected as fast speed mobile stations, since the receiver of the base station is adjusted so as to be optimal in view of a road that is closer to it. Thus, for example, the time interval from which the change in the frequency error is calculated may be too short for the fast speed mobile stations moving on a road further away from the base station to be reliably identified.

To allow the base station BTS shown in FIG. 2 to operate even with base station controllers that are not able to receive information regarding a possible fast speed mobile station in connection with the signalling associated with the call maintenance, the base station preferably comprises means by which this property can be switched on or off. The base station should therefore be initialized for sending speed reports. This initialization can take place, for example, by a separate command transmitted by the base station controller BSC for instance with other TRX parameters.

Figure 3:
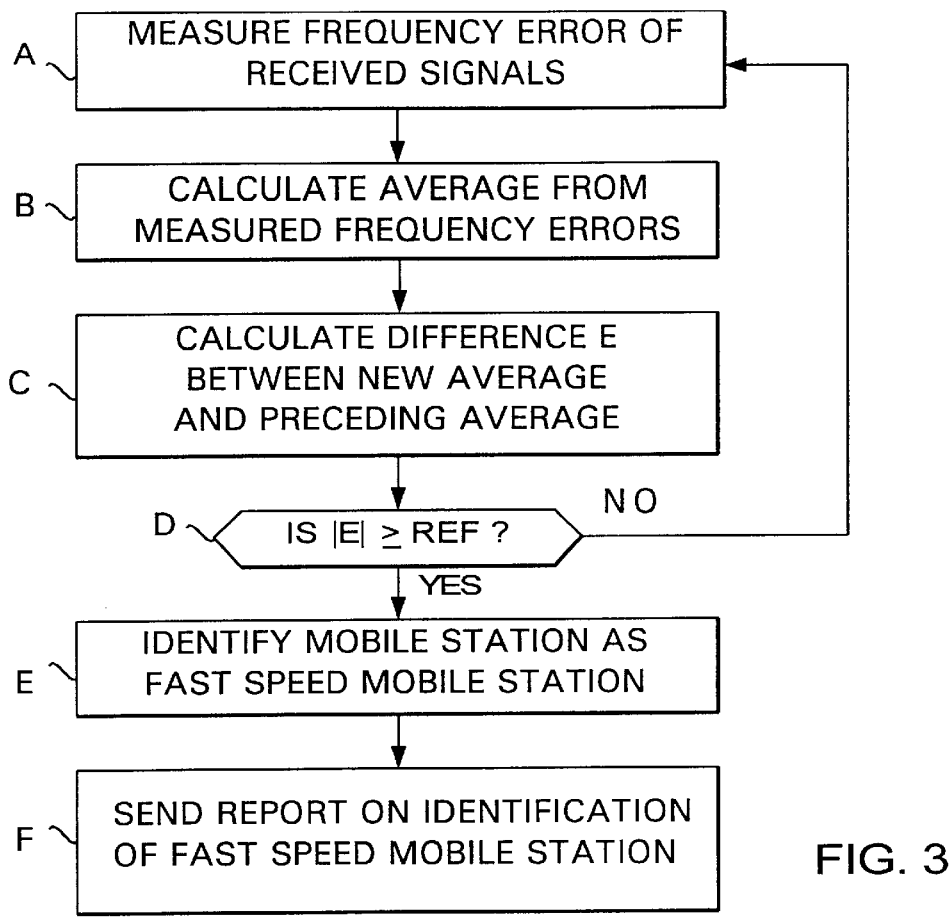
FIG. 3 is a flow diagram of a first preferred embodiment of the method of the invention.

FIG. 3 is a flow chart of a first preferred embodiment of the method of the invention.

In block A, the base station measures the frequency error from a received signal in a manner known per se. The measurement of the frequency error can be based in a GSM system, for example, on the phase error at the beginning or end of a burst. When the phase error is known, the frequency error of the received signal can be calculated on the basis of it. The properties of a complex matched filter can then be utilized in the measurement. After the filter, the phase error of the signal is zero, and in the case of a fixed frequency error, the phase error grows linearly towards the edges of the burst. According to the invention, the frequency error can be measured, for example, for each received burst.

In block B, an average is calculated from the measured frequency errors. The average is calculated, for example, on the basis of the measurement results obtained during the last four seconds.

In block C, the difference E between the last calculated average and the preceding average is calculated. Thereafter the last calculated average can be stored in a memory until the following calculation.

In block D, it is checked whether the absolute value of the calculated difference E is greater than a predetermined limit value ref given by the operator. If this is not the case, the process returns to block A. If the change in the frequency error proves to be greater than the limit value, the process proceeds to block E, where the mobile station is identified as a fast speed mobile station. In block D, it is also possible, if desired, to conduct an additional check to find out whether the sign of the frequency error has changed.

When the mobile station has been identified as a fast speed mobile station, information to this effect is transmitted to the base station controller. The base station preferably incorporates this information in the report on the measurement results to be sent to the base station controller. The information is thus transmitted to the base station controller in connection with signalling relating to call maintenance.

Figure 4:
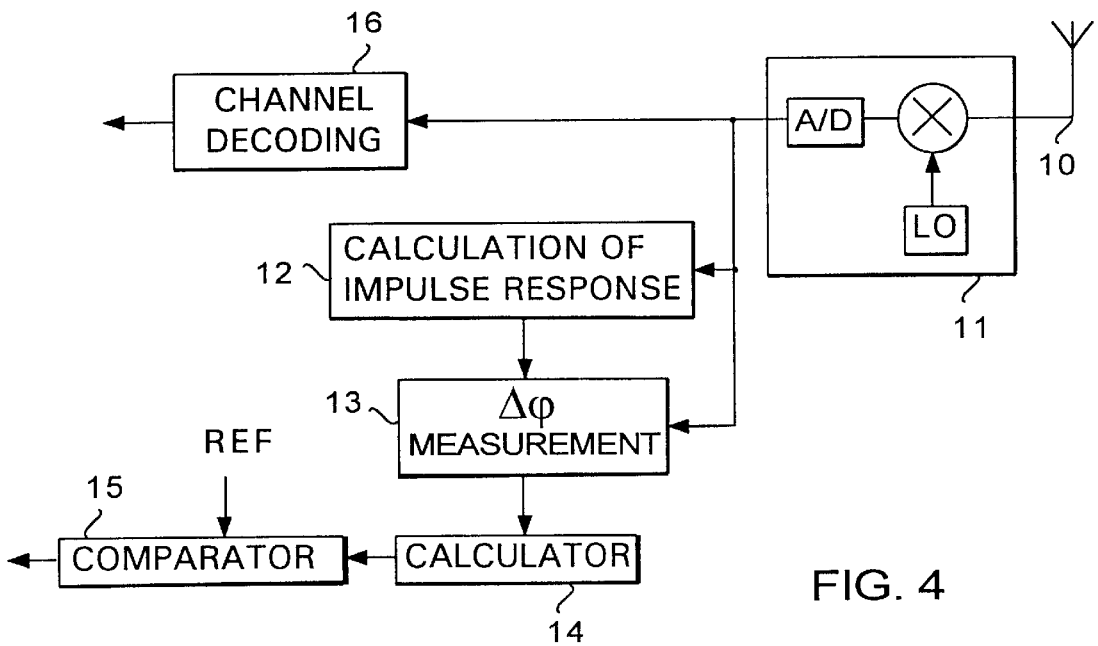
FIG. 4 is a block diagram of a first preferred embodiment of the base station of the invention.

FIG. 4 illustrates a first preferred embodiment of the base station of the invention. FIG. 4 shows a receiver unit of a GSM base station. The receiver unit measures the frequency error of a received burst in a manner known per se. The properties of a complex matched filter are utilized in the measurement. After the filter, the phase error of the received signal is zero in the middle of the burst at the training sequence code. In the case of a fixed frequency error, the phase error of the burst grows linearly towards the edges of the burst. It is thus sufficient that the phase error is estimated at the beginning and end of the burst.

A radio-frequency burst received by an antenna 10 is supplied to a receiver 11. The receiver 11 receives the signal supplied to it using an oscillator LO, whereafter the received signal is supplied to an AD converter. The samples obtained from the output of the AD converter are supplied to an impulse response calculation unit 12 and to a measurement block 13.

The impulse response calculation unit 12 calculates the impulse response in a manner known per se. In the GSM system, the impulse response of a channel is calculated using the correlation technique on the basis of the known training sequence code of a received burst, said code being located in the middle of the burst. The estimated taps (samples) of the impulse response of the channel are supplied to the measurement block 13, comprising a complex matched filter which is thus fully matched with the received signal at least in the middle of the burst. The taps are complex and there are five of them per burst. The taps are estimated at intervals of one bit sequence (3,69 µs).

In the measurement block 13, samples are taken from two measurement points located close to the end of the burst in such a way that samples are taken from each measurement point along a distance of 16 bits. Thereafter the samples are filtered by the complex matched filter. A suitable filter is, for example, a digital FIR filter. If there is a phase error in the received burst, it can be seen in the filtering result as growth of the imaginary portion.

The vectors obtained as the filtering result are summed as such at the beginning of the burst and as reversed at the end of the burst. This gives the phase vector V, which shows the average phase shift from the middle of the burst to the measuring points.

The total phase shift β at the ends of the burst is obtained by means of the phase vector V:

$$\beta = 2^* \arctan(\text{Im}(V)/\text{Re}(V))$$

Information on the measured phase error is supplied to a calculator 14. Since frequency is the derivative of phase, i.e. a change in a time unit, the calculator 14 can calculate the frequency error from the phase error supplied to it. in addition to this, the calculator 14 calculates the change in the frequency error in a predetermined time interval, and supplies a signal df representing it and a signal representing the sign of the frequency error to a comparator 15. The calculator is preferably provided with a memory so that it can calculate the average of the phase error measured during a predetermined time interval and store the calculated average until the next average is calculated.

If the comparator 15 detects that the change df in the frequency error exceeds the limit value ref predetermined by the operator, it indicates to the base station controller that the burst was sent by a fast speed mobile station.

It is to be understood that the description above and the accompanying figures are intended merely to illustrate the present invention. It will be obvious to one skilled in the art that the invention can be varied and modified in different ways without departing from the scope and spirit of the invention disclosed in the appended claims.

What is claimed is:

1. A method for identifying a fast speed mobile station in a radio system, said method comprising:

continuously measuring, at a base station, a frequency error of radio signals received from a mobile station;

calculating, at said base station, a change in said frequency error from a time interval of predetermined length;

identifying said mobile station as a fast speed mobile station if said change in said calculated frequency error exceeds a predetermined limit value; and transmitting, from said base station, a speed report concerning said mobile station to a base station controller, only when said mobile station has been identified as a fast speed mobile station.

2. A method according to claim 1, wherein said change in said frequency error is calculated by calculating a first average frequency error during a first time interval, and thereafter a second average frequency error during a second time interval, and finally an absolute value of a difference between said first average frequency error and said second average frequency error.

3. A base station of a radio system, said base station comprising:

a receiver arranged to receive signals transmitted by a mobile station;

means for continuously measuring a frequency error of said received signals;

a calculator unit responsive to said measuring means and arranged to calculate a change in said frequency error in a time interval of predetermined length;

a comparator responsive to said calculator unit and arranged to compare said change in said frequency error with a predetermined limit value and to identify said mobile station as a fast speed mobile station if said change in said frequency error exceeds said predetermined limit value; and means responsive to said comparator for sending a speed report concerning said mobile station to a base station controller only when said comparator of said base station identifies said mobile station as a fast speed mobile station.

4. A base station according to claim 3, wherein said calculator unit is arranged to calculate a first average of said frequency error based on measuring results obtained during a first time interval, a second average of said frequency error based on measuring results obtained during a second time interval, and an absolute value of a difference between said first and said second average of said frequency error to determine said change in said frequency error.

5. A base station according to claim 3, wherein said base station comprises means for adjusting a length of said time interval and said predetermined limit value to correspond to a set value given by an operator.

6. A base station according to claim 3, wherein said base station comprises means for sending said speed report to said base station controller in connection with signalling associated with call maintenance.

7. A base station according to claim 3, wherein said base station is a base station of a GSM system, and said base station is arranged to transmit said speed report to said base station controller in connection with measurement reporting defined in GSM Specification 08.58.

8. A base station according to claim 3, wherein said speed report contains at least a speed class of said mobile station.

9. A base station according to claim 7, wherein said speed report contains at least a speed class of said mobile station.

10. A method for identifying a fast speed mobile station in a radio system, said method comprising:

defining predetermined speed classes;

continuously measuring, at a base station, a frequency error of radio signals received from a mobile station;

calculating, at said base station, a change in said frequency error from a time interval of predetermined length;

identifying said mobile station as a fast speed mobile station if said change in said calculated frequency error exceeds a predetermined limit value; and identifying a speed class corresponding to said calculated change in said frequency error;

transmitting, from said base station, a speed report concerning said mobile station to a base station controller, only when said mobile station has been identified as a fast speed mobile station, said speed report including at least said speed class of said mobile station.

11. A base station of a radio system, said base station comprising:

a receiver arranged to receive signals transmitted by a mobile station;

means for continuously measuring a frequency error of said received signals;

a calculator unit responsive to said measuring means and arranged to calculate a change in said frequency error in a time interval of predetermined length;

a comparator responsive to said calculator unit and arranged to compare said change in said frequency error with a predetermined limit value and to identify said mobile station as a fast speed mobile station if said change in said frequency error exceeds said predetermined limit value;

means for identifying a predetermined speed class corresponding to said change in said frequency error; and means responsive to said comparator for sending a speed report concerning said mobile station to a base station controller only in response to an identification of said mobile station as a fast speed mobile station.

12. A base station of a radio system, said base station comprising:

a receiver arranged to receive signals transmitted by a mobile station;

a measuring mechanism to continuously measure a frequency error of said received signals;

a calculator unit responsive to said measuring mechanism and arranged to calculate a change in said frequency error in a time interval of predetermined length;

a comparator responsive to said calculator unit and arranged to compare said change in said frequency error with a predetermined limit value and to identify said mobile station as a fast speed mobile station if said change in said frequency error exceeds said predetermined limit value; and a sending mechanism, responsive to said comparator, to send a speed report concerning said mobile station to a base station controller only when said comparator of said base station identifies said mobile station as a fast speed mobile station.

13. A base station of a radio system, said base station comprising:

a receiver arranged to receive signals transmitted by a mobile station;

a measuring mechanism to continuously measure a frequency error of said received signals;

a calculator unit responsive to said measuring mechanism and arranged to calculate a change in said frequency error in a time interval of predetermined length;

a comparator responsive to said calculator unit and arranged to compare said change in said frequency error with a predetermined limit value and to identify said mobile station as a fast speed mobile station if said change in said frequency error exceeds said predetermined limit value;

an identifying mechanism to identify a predetermined speed class corresponding to said change in said frequency error; and a sending mechanism responsive to said comparator to send a speed report concerning said mobile station to a base station controller only in response to an identification of said mobile station as a fast speed mobile station.

* * * * *